United States Patent
Chakra et al.

(10) Patent No.: US 10,802,947 B2
(45) Date of Patent: Oct. 13, 2020

(54) FILTER TRACE BASED ON FUNCTION LEVEL

(71) Applicant: INTERNATIONAL BUSINESS MACHINES CORPORATION, Armonk, NY (US)

(72) Inventors: Al Chakra, Apex, NC (US); Zhen Yang Shi, Chang Ping District (CN); Tian Ming Pan, Chang Ping District (CN); Yi Xin Song, Chang Ping District (CN); Yang Zhang, Chang Ping District (CN); Yu Kun Wei, Chang Ping District (CN); Fu Li Bian, Bei Jing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

(21) Appl. No.: 15/865,477

(22) Filed: Jan. 9, 2018

(65) Prior Publication Data

US 2019/0213109 A1 Jul. 11, 2019

(51) Int. Cl.
*G06F 11/36* (2006.01)
*G06F 11/34* (2006.01)
*G06F 11/30* (2006.01)

(52) U.S. Cl.
CPC ...... *G06F 11/3636* (2013.01); *G06F 11/3006* (2013.01); *G06F 11/3072* (2013.01);
(Continued)

(58) Field of Classification Search
CPC ................... G06F 11/30; G06F 11/302; G06F 11/3065–3495; G06F 11/362–3664;
(Continued)

(56) References Cited

U.S. PATENT DOCUMENTS 6,493,837 B1 * 12/2002 Pang ................... G06F 11/3466
707/999.202
7,047,521 B2 5/2006 Bunnell
(Continued)

OTHER PUBLICATIONS

Xu et al., "Automatic Diagnosis and Response to Memory Corruption Vulnerabilities", CCS'05, Nov. 7-11, 2005, pp. 1-12.

*Primary Examiner* — Todd Aguilera
(74) *Attorney, Agent, or Firm* — Cantor Colburn LLP; Teddi Maranzano

(57) ABSTRACT

A computer-implanted method for creating a filtered digital entry includes generating, via a processor implementing a trace generation engine, a trace indicative of successful transactions and erroneous transactions. The processor instantiates a plurality of buffers in a buffer pool each configured to record a trace function boundary. The processor then analyzes each buffer in the buffer pool based on the trace function boundary to evaluate whether each function entry in the trace contains an erroneous transaction. If the processor determines that a function entry contains an erroneous transaction, the processor sets an output flag in a call stack map associated with that function. The processor then generates a filtered digital entry based on the call stack map. The filtered digital entry includes only erroneous transaction data from the trace.

3 Claims, 10 Drawing Sheets

(52) U.S. Cl.
CPC ...... *G06F 11/3466* (2013.01); *G06F 11/3476*
(2013.01); *G06F 2201/86* (2013.01); *G06F 2201/87* (2013.01)

(58) Field of Classification Search
CPC ............. G06F 11/3006; G06F 2201/86; G06F 2201/87
USPC .......... 717/124–135; 714/38.1–38.14, 45, 46
See application file for complete search history.

(56) References Cited

U.S. PATENT DOCUMENTS

| | | | |
|---|---|---|---|
| 7,194,731 B1 | 3/2007 | Cantrill | |
| 7,716,335 B2* | 5/2010 | Dinker | G06F 11/3409 709/203 |
| 7,975,262 B2* | 7/2011 | Cozmei | G06F 11/3688 717/128 |
| 8,589,890 B2 | 11/2013 | Eccles et al. | |
| 8,924,932 B2* | 12/2014 | Granshaw | G06F 8/73 717/123 |
| 8,997,058 B2* | 3/2015 | Bohnet | G06F 11/3612 717/128 |
| 9,678,821 B2* | 6/2017 | Hess | G06F 11/0778 |
| 2007/0011330 A1* | 1/2007 | Dinker | G06F 11/3409 709/226 |
| 2007/0255979 A1 | 11/2007 | Deily et al. | |
| 2009/0049428 A1* | 2/2009 | Cozmei | G06F 11/3636 717/128 |
| 2013/0091387 A1* | 4/2013 | Bohnet | G06F 11/3636 714/38.1 |
| 2014/0310688 A1* | 10/2014 | Granshaw | G06F 11/366 717/123 |
| 2016/0328311 A1* | 11/2016 | Hess | G06F 11/0778 |

\* cited by examiner

FILTER TRACE BASED ON FUNCTION LEVEL

BACKGROUND

The present invention relates to filter trace debugging systems, and more specifically, to filter traces based on a function level.

A transaction processing system is a type of information system that collects, stores, modifies and retrieves organizational transactions. In this regard, a transaction is an event that generates or modifies data that is eventually stored in an information system.

Among various functions, transaction monitor functions are important to transaction processing systems. Transaction monitor functions include deadlock detection and resolution resulting from cross-dependence on data, and transaction logging in trace logs for forward recovery in case of transaction failures requiring debugging. A busy transaction processing system can process many millions of transactions each day. When a problem arises, end users often must resort to sophisticated vendor provided technical support to execute trace operations to capture trace log data with respect to a recognized failure. Consequently, a trace is captured and sent to technical support, typically by electronic means. The problem then becomes one of diagnosing what has gone wrong.

The trace typically spans a very short time period, perhaps only a few seconds of clock time even for a large trace data set on a busy system. The transaction data causing the reported failure is viewable, but without a trace log that includes tools for comparison purposes of the data having the fault to data from a previously successfully completed instance of the transaction, it can be very difficult to diagnose what has gone wrong. The absence of trace data for a previously successful completion of a failed transaction can make problem diagnosis difficult, resulting in unnecessary and burdensome interactions between the customer and technical support which can be irritating from the view of the customer and costly from the view of the vendor.

The problem of error determination or trace analysis is becoming increasingly difficult and inefficient as the trace data becomes larger and increasingly complex. Moreover, a large data size introduces I/O performance issues in certain scenarios. For example, the size of trace log of a monitoring agent may reach to 1 GB of data, which can be nearly equal to the size of a dump file. Much of the data in the trace log may be useless for the engineer, and in fact, impedes their ability to isolate the useful data to discover the root of the problem. Current approaches include filtering the successful part of trace base on transaction level or file level. Conventional approaches to trace filtering cannot resolve the problem when the transaction or file is complex.

SUMMARY

Embodiments of the present invention are directed to a computer-implemented method for creating a filtered digital entry. The method includes generating, via a processor implementing a trace generation engine, a trace indicative of successful transactions and erroneous transactions. The processor instantiates a plurality of buffers in a buffer pool configured to record a trace function boundary. The processor then analyzes each buffer in the buffer pool based on the trace function boundary to evaluate whether each function entry in the trace contains an erroneous transaction. If the processor determines that a function entry contains an erroneous transaction, the processor sets an output flag in a call stack map associated with that function. The processor then generates a filtered digital entry based on the call stack map. The filtered digital entry includes only erroneous transaction data from the trace.

Also described is a system for creating a filtered digital entry. The system includes a processor configure to generate a trace indicative of successful transactions and erroneous transactions, and instantiate a plurality of buffers in a buffer pool configured to record a trace function boundary. The processor then analyzes each buffer in the buffer pool based on the trace function boundary to evaluate whether each function entry in the trace contains an erroneous transaction. If the processor determines that a function entry contains an erroneous transaction, the processor sets an output flag in a call stack map associated with that function. The processor then generates a filtered digital entry based on the call stack map. The filtered digital entry includes only erroneous transaction data from the trace.

A computer program product for generating a filtered digital entry is also described. The computer program product includes a computer readable storage medium having program instructions embodied therewith. The program instructions are executable by a processor to cause the processor to perform a method. The method includes generating, via a processor implementing a trace generation engine, a trace indicative of successful transactions and erroneous transactions. The processor instantiates a plurality of buffers in a buffer pool configured to record a trace function boundary. The processor then analyzes each buffer in the buffer pool based on the trace function boundary to evaluate whether each function entry in the trace contains an erroneous transaction. If the processor determines that a function entry contains an erroneous transaction, the processor sets an output flag in a call stack map associated with that function. The processor then generates a filtered digital entry based on the call stack map. The filtered digital entry includes only erroneous transaction data from the trace.

DETAILED DESCRIPTION

Figure 1:
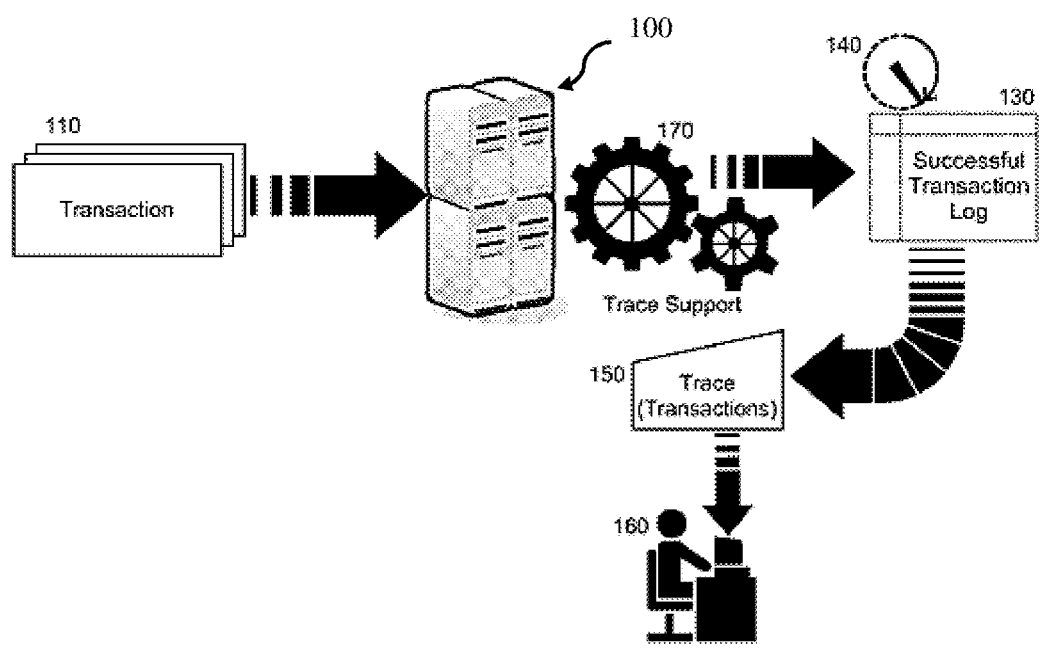
FIG. 1 depicts a transaction processing system for trace capture of successfully completed transactions according to an embodiment.

In the field of IT analytics, it is becoming increasingly advantageous to bring IT operations closer to the source of the data generation. Currently, the industry off-loads the trace data to another server that ingests and interprets the millions of lines of data that arrive. The service of ingesting that large volume may charge per GB, per day, for ingestion of that data. At the same time, applications become more "chatty", generating larger amounts of data. To add to the current problem, there are also a larger number of applications managed in many business environments.

For example, a system programmer may receive a call indicating that some portion of the program is running slow. Using a conventional trace system, the programmer searches a large body of data to determine what the error is. Hours would be spent searching for "a needle in a haystack" because of the volume and the amount of non-error code. Although tools exist that can assist the programmer, the data frequently "ages out" by the time it is discovered by the programmer. Since the triggering event is passed by the time the source data is discovered, the search result may not be optimal or usable at all. On the other hand, if the programmer obtains the error path at the source of the generation of the traces, then faster reaction is possible, and diagnosis is closer to the source (dealing with younger data and more targeted and relevant data).

One existing method for trace generation is based on transactions, such as collecting completion transactions in a transaction processing system, discovering the failed transaction, and filtering out each transaction's trace by providing with the generated trace an entry from the trace. This method is less than advantageous because it is storage consuming and key failure information can be lost.

Another conventional method includes entering a key word that indicates a term to be searched based on the user's personal knowledge or experience with a particular type of error. Using this conventional method, a user can manually generate a trace when a file contains that entered key word. This known method can be efficient if the developer is familiar with the system. However, using the keyword entry method, the trace information generated is partial, which may not be useful to discover the source of the system failure. Moreover, this conventional method of keyword entry is time consuming for the programmer. It would be advantageous to provide a system that allows a system programmer to obtain targeted pieces of data that indicate an error with less searching for those pieces of data amongst the huge corpus of data.

Embodiments of the present invention filter useless information from the search result data on a function level with related context. Related context is the relationship between a calling function and a called function. Input/output (I/O) performance is significantly improved, thereby improving the functionality and efficiency of the processors and the computing system. In some aspects, the processor filters the useless information and retains the trace with an error or related context that leads to the discovery of the error. The system analyzes the generated trace asynchronously in the buffer pool in a separated process. For example, in a function call stack A-to-B-to-C, if only function B has an error, then the trace of C is filtered out and the trace of A is retained. Since A is the caller of B, some of the operation in A may cause the error in B. This relationship is referred to herein as related context.

FIG. 1 depicts a transaction processing system 100 for trace capture of successfully completed transactions for trace debugging of failed transactions, according to an embodiment. As shown in FIG. 1, the transaction processing system 100 includes a trace support mechanism 170 for adding entries into a successful transaction log. The system 100 can retrieve and process different transactions 110 generated by executing software, then detect successfully completed transactions from the transactions 110. In response to detecting successfully completed ones of the transactions 110, the trace support 170 can add an entry in a successful transaction log 130 for each successfully completing one of the transactions 110 so long as an entry that is not stale according to a timer 140 does not already exist in the log 130 for the completed ones of the transactions 110. Thereafter, upon initiating a trace 150 in response to detecting a failed one of the transactions 110, the system 100 can provide the trace 150 to a debugging end user 160. The trace 150 includes an entry from the log 130 for a successfully completed instance of the failed one of the transactions 110.

Figure 2:
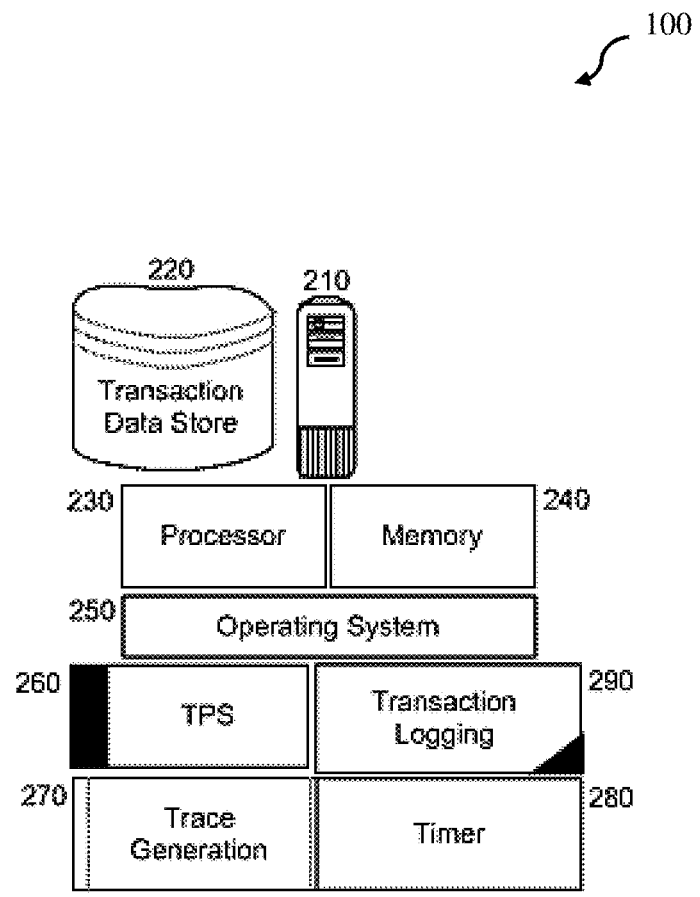
FIG. 2 depicts a transaction data processing system configured for function level trace debugging of failed transactions according to one embodiment.

FIG. 2 schematically shows the transaction processing system 100 configured for trace capture of successfully completed transactions, which is then used for trace debugging of failed transactions. The system 100 includes a host server 210 with at least one processor 230 and memory 240 supporting the execution of an operating system 250. The operating system can support the operation of a transaction processing system 260 processing different transactions. Additionally, a trace generation component 270 is coupled to the transaction processing system 260 and configured to generate a trace for trace debugging. The transaction processing system 100 may be a computing system such as the system described with respect to FIG. 8.

The transaction logging module 290 is coupled to the transaction processing system 260. The transaction logging module 290 includes program code enabled upon execution in the memory 240 of the host server 210 to log in transaction data store 220 information pertaining to successfully completed transactions in the transaction processing system 260. In particular, the information can include events in a successfully completed process such as the calling of and return from functions, the exit of processes and other significant occurrences in the execution of a program can be logged. The program code of the transaction logging module 290 further is configured to ensure only a single non-stale entry for each successfully completed transaction in reference to a timer 280. A non-stale entry of a transaction is a transaction that was created less than a predetermined amount of time from the creation of the log. The program code of the transaction logging module 290 is enabled upon the generation of the trace for a failed transaction by trace generation engine 270, to include in the trace information from the log pertaining to the successful completion of the failed transaction.

Figure 3:
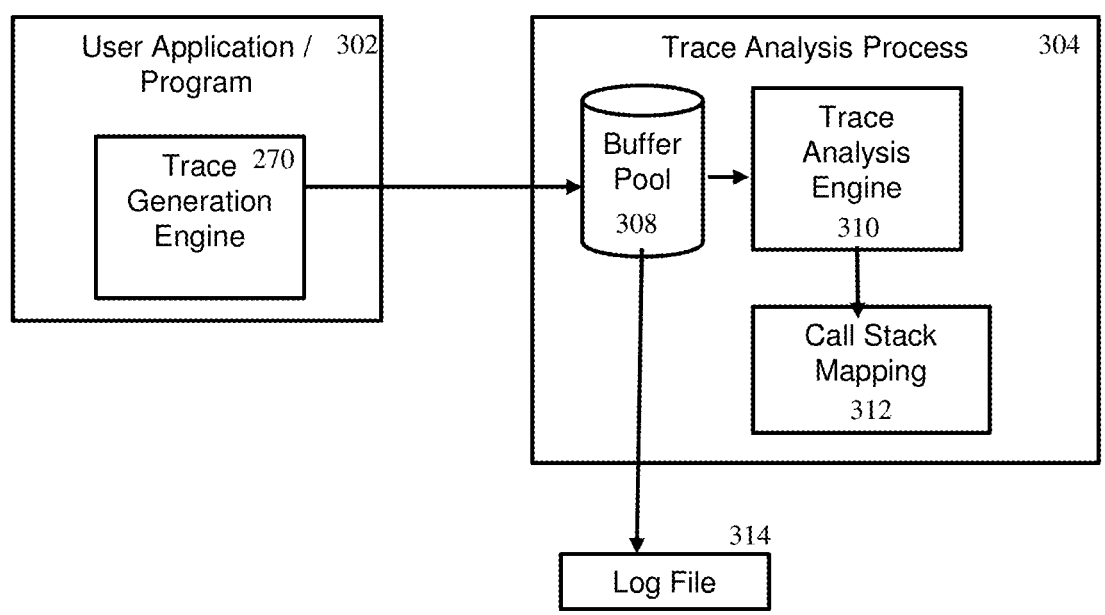
FIG. 3 is a flow diagram of a function level transaction data processing service according to one embodiment.

FIG. 3 is a flow diagram of a function level transaction data processing service, according to one embodiment. In one aspect, the data processing service includes a user application 302 that includes a trace generation engine 270. In one aspect, the trace analysis process 304 includes instantiation of a buffer pool 308, the trace analysis engine 310, and a call stack mapping module 312.

The buffer pool 308 is a set of data buffers. Each of the set of data buffers is configured to record trace on a function boundary. The trace generation engine 270 outputs the generated trace data to the buffer pool 308, where the buffer pool records the trace on the function boundary then outputs the recorded function boundary information to the trace analysis engine 310.

The trace analysis engine 310 analyzes each buffer in the pool 308 and determines whether the retained trace has an error according to specified rule or user configured rule. The trace analysis engine 310 breaks down program entries from the trace and creates a buffer pool that is temporary to enable that filtering. The buffer pool is a temporal buffer pool set to include a plurality of buffers that are each used to record a trace by a functional boundary only. The temporal buffer pool 308 enables us to narrow the path of the code to enable a cascading model (call stack mapping 312) that enables a trace identification of an entry of an identified error, and also for the upstream entries of the functions containing the identified error.

Accordingly, a rule database (e.g., an operatively connected computer readable memory such as, for example, the transaction datastore 220) stores rule associations between a rule and an erroneous function entry. Those skilled in the art appreciate that trace rules are applicable by a processor to determine whether a trace includes an error or includes data consistent with a successfully completed transaction.

After the trace analysis engine 310 identifies the retained trace error(s), the call stack mapping module 312 maintains a call stack map of the program with an output flag set for each of the function entries. The output flag is a bit indicative of whether a portion of the trace should be output as erroneous. For example, a bit value of 1 may indicate an erroneous state, where a bit value of 0 may indicate a successfully completed state. The flags are also referred to herein as being Y (having a 1) and an N (having a zero).

The trace analysis process 304 outputs a log file 314 having only the erroneous traces, which results in a trace reduced from 1 GB or more of data to 100 kb or less of data. The reduced (filtered) trace dataset is manageable by the end user 160. The erroneous traces are identified by the flag being set to 1 or "Y". All data associated with the erroneous traces are output to the log file 314, where successfully completed functions (identified by a flag set to 0 or "N") are omitted from the log file 314.

Figure 4:
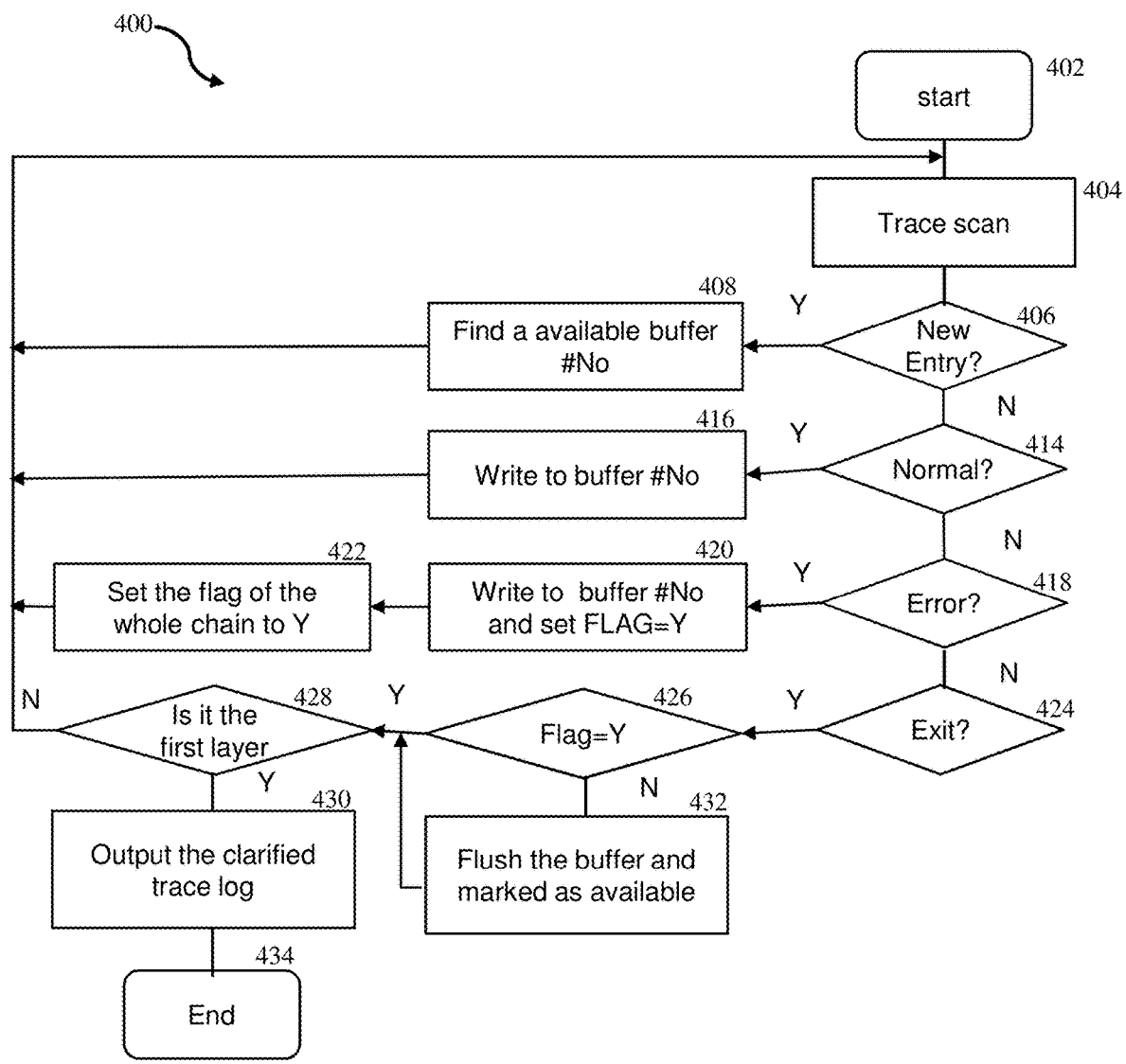
FIG. 4 is a block diagram of a horizontal affinity score for a function level transaction data processing service according to one embodiment.

FIG. 4 is a flow diagram of a method 400 for filtering a program trace with a function level transaction data processing service, according to one embodiment. At an initial starting step 402, at block 404 the processor 230 generates, using the trace generation engine 270, a trace scan that indicates a full history of functions implementing transactions. The history or log indicates both successful transactions and erroneous transactions and is typically very large (1 GB or more of data).

At block 406 the processor 230 evaluates whether the scanned entry is new (and thus unassigned to a buffer). Responsive to determining that the entry is new, the processor 230 assigns an available buffer in the buffer pool 308, as shown in block 408, and re-starts the trace scan. The processor 230 then determines at block 414 whether the entry is normal. A normal entry is a function entry that was executed successfully without an exit or error resulting from its execution (and thus, having a flag set to N or 0). Responsive to determining at block 414 that the entry is normal, at block 416 the processor 230 writes the log of that function execution to the buffer log, which may be saved to a cache memory of the system, or another computer-readable memory.

Responsive to determining that the function entry contains an erroneous transaction (block 418), at block 420 the processor 230 sets an output flag associated with the function entry. Setting the output flag includes changing a bit value from 0 (indicating a normal condition without errors) to a 1 (indicating an erroneous condition with an exit, error, etc.). The processor 230, therefore, sets the output flag in the call stack map associated with that function.

At block 422, the processor 230 also sets the flags of all function entries subsequent to (associated with) the erroneous function entry to indicate that they are also erroneous, or at least, should be examined to determine the erroneous portion.

At block 424, the processor 230 determines whether an entry is an exit entry indicating the end of the program. When an exit entry is identified, the processor 230 evaluates whether the error flag is a "yes" at block 426, indicating the identification of an error. When the flag is not a "yes" or a 1, then at block 432 the processor 230 flushes the buffer and marks the buffer as available. This keeps the final data written to the log free of noisy information that is not indicative of an error. At block 428 the processor 230 determines whether there are subsequent layers in the call stack map to evaluate.

At block 430, determinative that the present layer is the top layer (and thus all layers of the trace are evaluated), at block 430 the processor 230 generates a log file 314 based on the call stack map. The log file 314 is a filtered digital entry that includes only erroneous transaction data from the original trace.

At block 434 after generation and output of the filtered digital entry 314, the processor ends the process.

Figure 5:
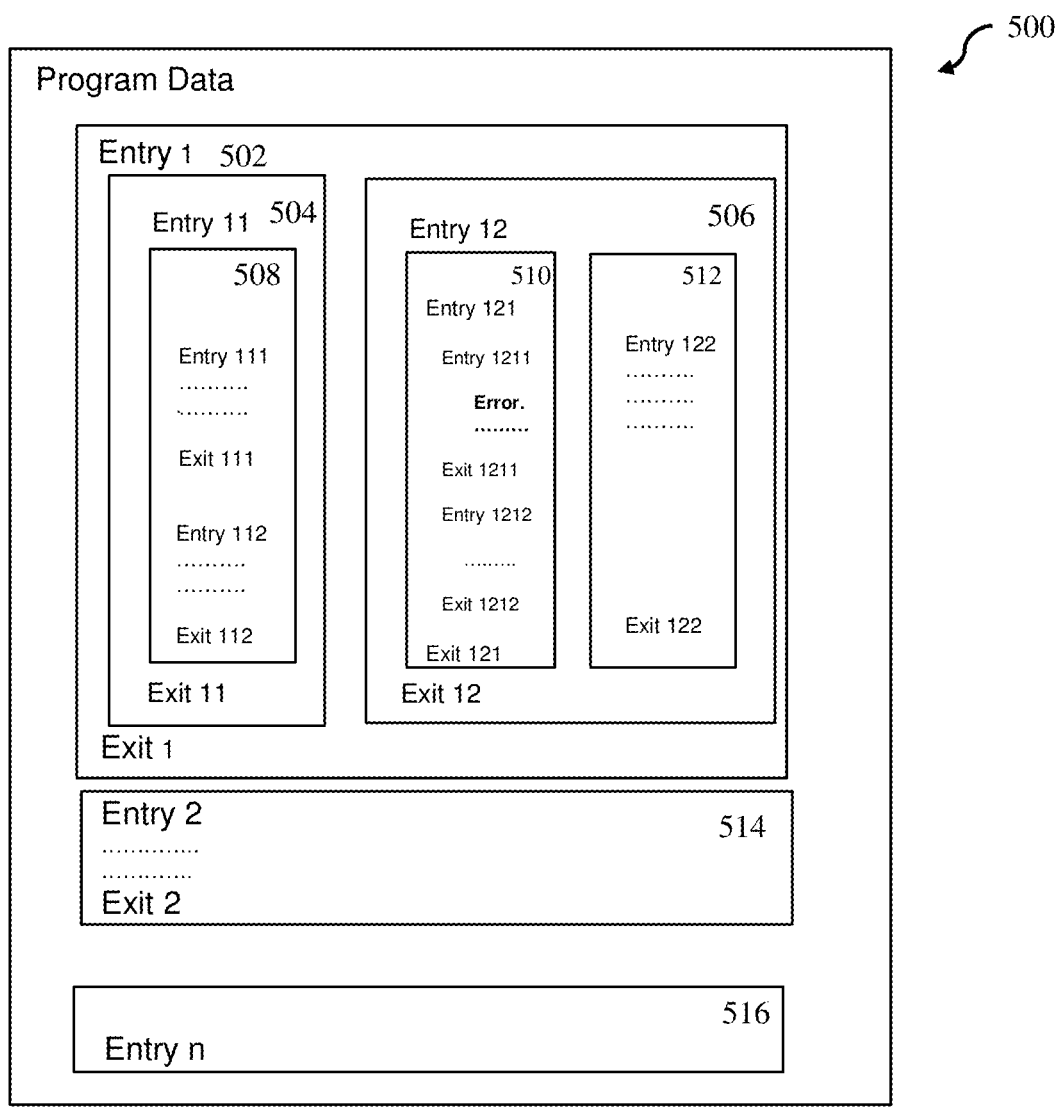
FIG. 5 is a block diagram of horizontal affinity scoring and vertical affinity scoring for a function level transaction data processing service.
Figure 6:
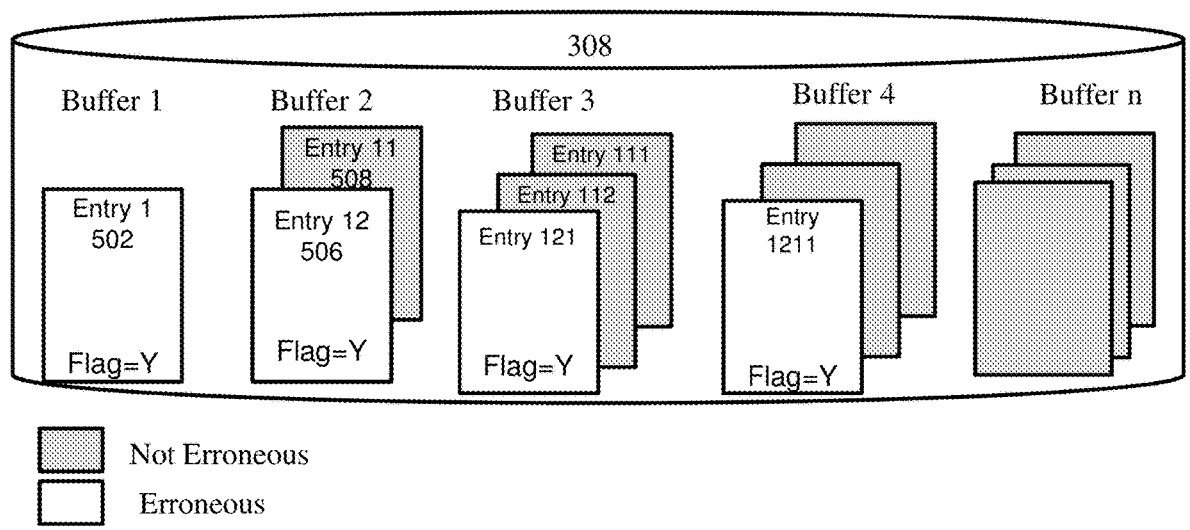
FIG. 6 depicts a block diagram of a buffer pool according to one embodiment.

By way of example, FIG. 5 depicts a block diagram of horizontal affinity scoring and vertical affinity scoring for a function level transaction data processing service. FIG. 6 is a block diagram of call stack mapping, according to one embodiment. Looking first at FIG. 5, program data 500 is depicted having a plurality of function entries including entry 1 (502), entry 2 (514), etc. which continues to the last entry n (516). Those skilled in the art appreciate that although three entries are shown, any number of entries are contemplated.

The function entry 1 (502) is associated with a subsequent function entry 11 (504). The entry 504 calls a series of functions 508 until it reaches the respective exit (shown as "exit 112" at the end of the call stack 508). The function entry 1 (502) also includes in its subsequent function call structure the entry 12 (506). The function entry 1 is shown in FIG. 5 as complete after executing all of its called function entries 504 and 506. After execution of entry 1 (502), the program data 500 is shown executing entry 2 (514) etc.

As an example, if an error occurs in the call structure 510 of entry 12 (block 506) at entry 1211 (block 510), the program trace data would show that entry 1 (block 502) has an error. Using conventional techniques, the trace would include the function data of all functions included in entry 1 (block 502). This data could be massive because it includes program data for entry 11 (block 504) (and within entry 11 all of the called function data of entry 111, entry 112, etc.). The conventional output would also include all of the program data for entry 12 (block 506), with the data from the entire call structure shown in block 510, and the data from the entire call structure shown in block 512. The result could be an enormous (e.g., 1 GB or more) corpus of textual data that includes all of the program execution data for entry 1 (block 502). In the present example, if the error resides exclusively at entry 1211, which is found within the call structure 510 inside of entry 12 (block 506) of entry 1 (block 502), then the output trace data is the analogous "haystack", where the "needle" is the one or two lines of erroneous code at entry 1211 in block 510.

By way of example, according to one embodiment, FIG. 6 depicts a block diagram of a buffer pool 308. Each buffer 1 through buffer n of the buffer pool 308 is shown being either unavailable (because it contains function entries) or available (having no function entries stored within the buffer). As shown in FIG. 6, buffers 1-4 are unavailable, while buffer n is available. In the present example, buffer 1 is shown having the entry 1 (502) saved within it. The entry 502 contains the erroneous transaction (and also successful transaction data, which is by far the majority of the data in the entry). The erroneous transaction within the entry 502 is identified by the output flag set to Y (e.g., having a 1 in the bit field associated with the error flag). As shown in FIG. 6, the process iteratively saves to each available buffer 2-n, a next function entry for each function containing the erroneous transaction data. The processor performs this iterative process by evaluating a next function entry based on a predetermined search width and saving any subsequent functions called by the erroneous function entry to a respective available buffer in the buffer pool. In the present case, the processor 230 sets an output flag for each function entry in the call stack map for entry 1 (502), which includes entry 11, entry 12, entry 111, entry 112, entry 121, entry 1211, etc. With each successive iteration at the processor 230 drills down the function call list to determine the function call (entry 510) containing the erroneous transaction (e.g., entry 1211).

The search width is a width by which the processor 230 searches for related function entries. The search width as referred to herein can indicate a desired degree of separation between two particular functions that are considered during the search, and can be changed by a user based on the desired scope of the search. For example, the processor 230 may search a first degree of separation between two functions (e.g., where function x calls function y). In another example, the processor 230 may search a second degree of separation searching function x to function z (e.g., when some function calls function x, which then calls function y, which then calls function z, etc.). The search width is user selectable to change the scope of the search. For example, in one aspect, the search width can be user changeable to include a wide search width that searches four degrees of separation, five degrees of separation, etc. A wider search width can produce a greater quantity of search results, which may or may not be advantageous to the user based on the desired scope of the search. In other aspects, a narrower search scope (e.g., one degree of separation) can produce a smaller quantity of search results that satisfies the query. The search width may be selectable in response to a query (e.g., a dialogue box, message, etc.) output by the processor 230. The user can select the search width via a pull-down menu or via text entry.

The search results may also be customized according to a user-selectable affinity score setting. An affinity score setting is a numeric value stored to memory that allows a user to weight one type of function as highly applicable to the search, and weight another type of function as less applicable to the search. For example, a first type of function (e.g., function xyz) may be user-assigned an affinity score of 1×, where another type of function is assigned an affinity score of 3.5×, etc. In some aspects, the user-selectable search width, and the user-selectable affinity score can provide customizable instructions for the processor 230 to search functions in the call stack.

Figure 7:
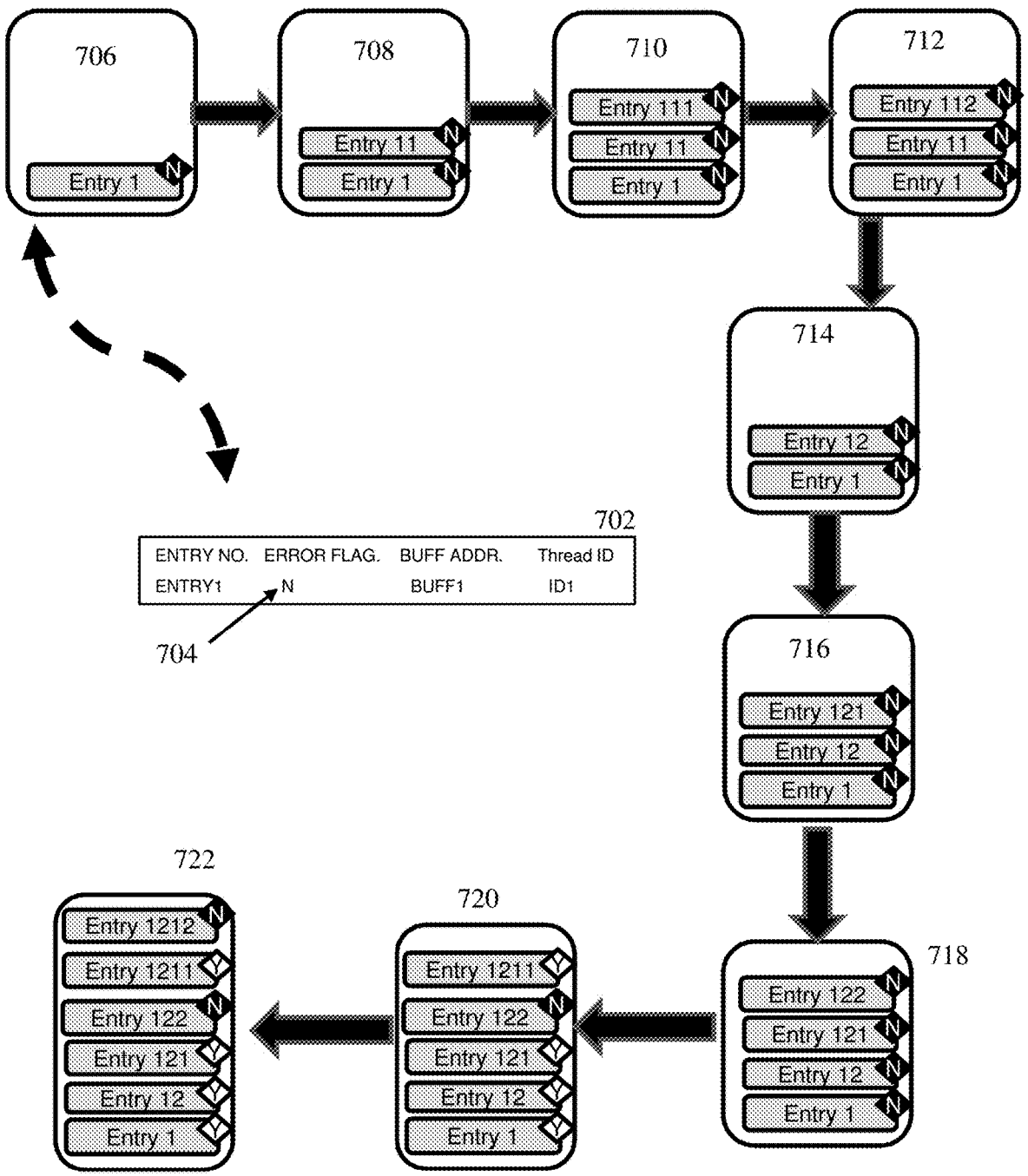
FIG. 7 is a block diagram of call stack mapping according to one embodiment.

Continuing with the present example, FIG. 7 depicts a block diagram of a call stack mapping, according to one embodiment. As shown in FIG. 7, the processor 230 evaluates each function entry (e.g., entry 1 to entry n) to determine whether an error exists within the function. The flag information is saved as call stack data 702. Call stack data 702 reflects an entry for the entry 1 (502, on FIGS. 5 and 6). Notably, this entry contains erroneous data, as indicated by the flag 704 in the stack data 702. Each progressive iteration of the example (706, 708, 710, 712, 714, 716, 718, 720, and 722) the flag 704 is set for each entry according to the functional relationship with its called functions (or the functions calling the respective function entry). At iteration 720, an error is found in function 1211, so Entry 1211 is marked as "Y," and also marked "Y" for its predecessors. At iteration 722, the processor 230 continues with the remaining functions. Until the final iteration, each respective function entry is included in the buffer pool 308, all function entries associated with the erroneous transaction are identified, and the function entries associated with successful transactions are deleted from the temporary buffers. The processor 230 outputs all the entries with flag "Y" at the final iteration, where the Y is indicative that the function entry contains information of interest to a programmer. The function entries marked N are successful transaction data that would not be of value to the debugging programmer, and thus, it is omitted from the output.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least four service models, and at least four deployment models.

Characteristics of a Cloud Model

On-demand self-service: a cloud consumer can unilaterally provision computing capabilities, such as server time and network storage, as needed automatically without requiring human interaction with the service's provider.

Figure 10:
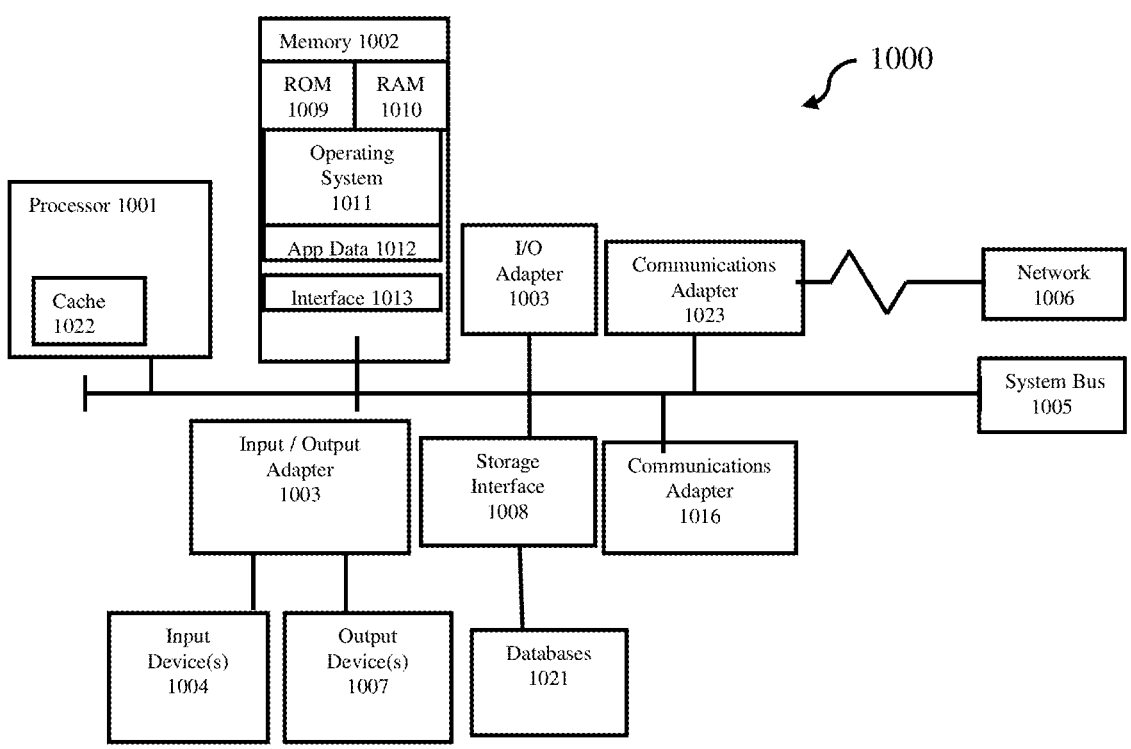
FIG. 10 depicts a block diagram of a computer system and environment, according to one embodiment.

Broad network access: capabilities are available over a network (e.g., network 1006, as depicted in FIG. 10) and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network (e.g., network 1006, as depicted in FIG. 10), servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks (e.g., network 1006, as depicted in FIG. 10), servers, operating systems, or storage, but has control over the deployed applications and possibly application hosting environment configurations.

Infrastructure as a Service (IaaS): the capability provided to the consumer is to provision processing, storage, networks (e.g., network 1006, as depicted in FIG. 10), and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Database as a Service (DBaaS): a cloud-based approach to the storage and management of structured data that delivers database functionality similar to what is found in relational database management systems (RDBMSes) such as, for example, SQL Server, MySQL, and Oracle. DBaaS provides a flexible, scalable, on-demand platform oriented toward self-service and database management, particularly in terms of provisioning a business' own environment. DBaaS systems can include monitoring engines to track performance and usage, error monitoring, and data analysis engines.

Deployment Models

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party either locally or remotely.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

Figure 8:
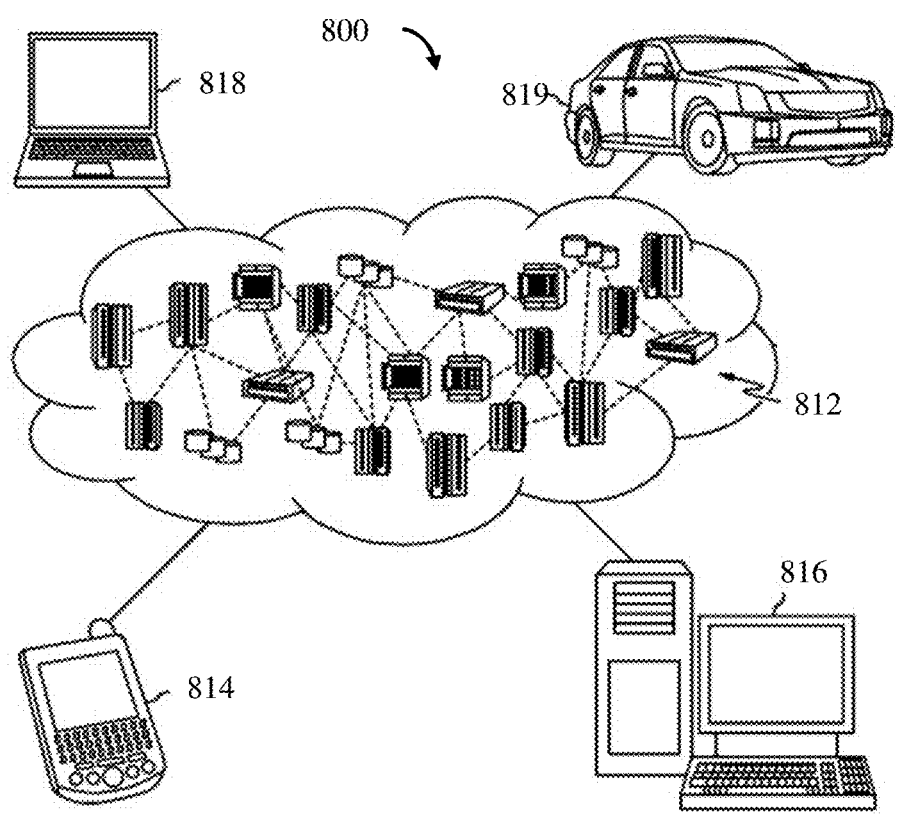
FIG. 8 depicts a cloud computing environment, according to one embodiment.

Referring now to FIG. 8, a cloud computing environment 800 for use in practicing the teachings herein is depicted. As shown in FIG. 8, cloud computing environment 800 comprises one or more cloud computing nodes 812 with which local computing devices used by cloud consumers, such as, for example, a mobile device 814, a desktop computer 816, a laptop computer 818, and/or an automobile computer system 819 can communicate. Cloud computing nodes 812 can communicate with one another. They can be grouped (not shown) physically or virtually, in one or more networks 810, such as a Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 814-819 shown in FIG. 8 are intended to be illustrative only and that cloud computing nodes 812 and cloud computing environment 800 can communicate with any type of computerized device over any type of network and/or network addressable connection (e.g., using a web browser).

Figure 9:
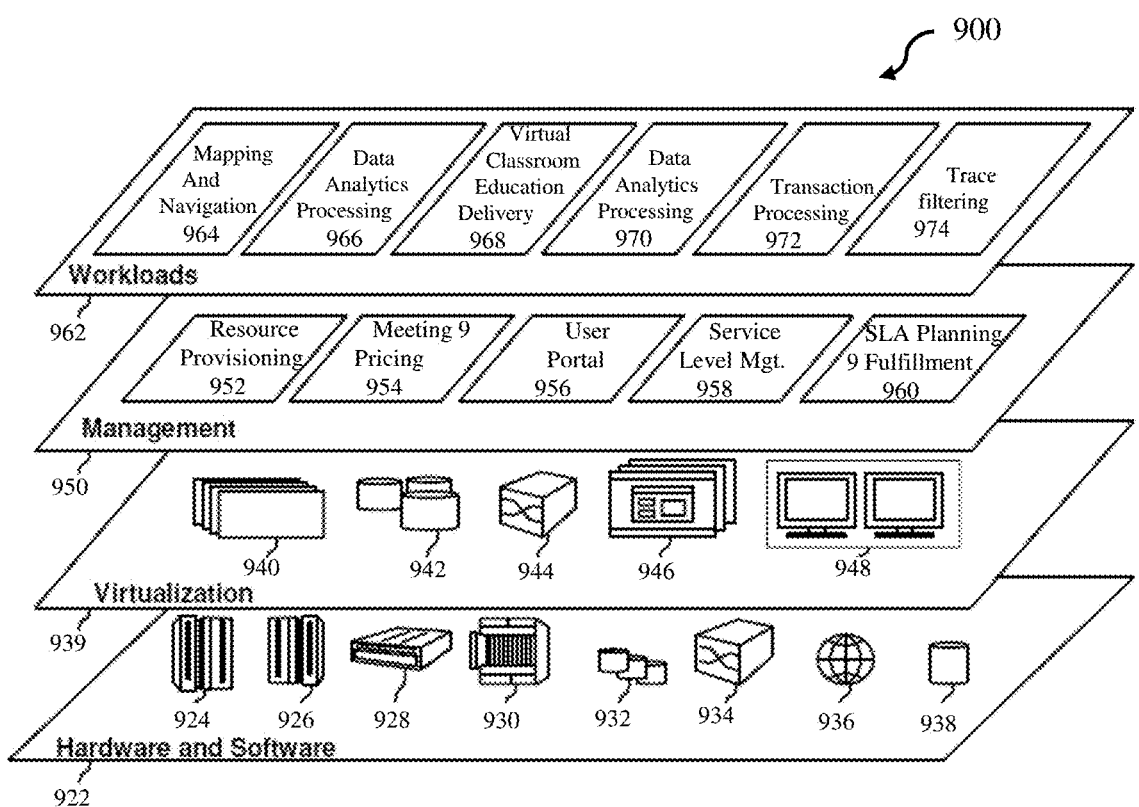
FIG. 9 depicts abstraction model layers, according to one embodiment.

Referring now to FIG. 9, a set of functional abstraction layers 900 provided by cloud computing environment 910 (as depicted in FIG. 8) is shown. It should be appreciated that the components, layers, and functions of functional abstraction layers 920 depicted in FIG. 9 are illustrative only, and embodiments of the invention are not limited thereto. As depicted, the following layers and corresponding functions are provided:

A hardware and software layer 922 can include hardware and software components. Examples of hardware components can include, for example, mainframes 924, 9RISC (Reduced Instruction Set Computer) architecture based servers 926, servers 928, blade servers 930, storage devices 932, and networks and networking components 934. In some embodiments, software components include network application server software 936 and database software 938.

A virtualization layer 939 can provide an abstraction layer from which the following examples of virtual entities can be provided: virtual servers 940, virtual storage 942, virtual networks 944, which can include virtual private networks, virtual applications and operating systems 946, and virtual clients 948.

In one example, a management layer 950 can provide the functions described below. A resource provisioning module 952 can provide dynamic procurement of computing resources and other resources that can be utilized to perform tasks within the cloud computing environment. A metering and pricing resource 954 can provide cost tracking as resources are utilized within the cloud computing environment, and billing or invoicing for consumption of these resources. In one example, metering and pricing resources can include application software licenses. A user portal 956 can provide access to cloud computing environment 800 for consumers and system administrators (not shown). In some embodiments, user portal 956 can provide security and/or identity verification for cloud consumers (e.g., one or more consumers operating one or more of computing devices 814-819) and tasks, as well as protection for data and other resources. A service level management resource 958 can provide cloud computing resource allocation and management such that required service levels are met. A service level agreement (SLA) planning and fulfillment resource 960 can provide pre-arrangement for, and procurement of cloud computing resources for which a future requirement is anticipated in accordance with an SLA.

A workloads layer 962 can provide functionality for which the cloud computing environment can be utilized. For example, workloads layer 962 can include a mapping and navigation resource 964, a software development and lifecycle management resource 966, a virtual classroom education delivery resource 968, a data analytics processing resource 970, a transaction processing resource 972, and trace filtering 974.

FIG. 10 illustrates a block diagram of an exemplary computing environment and computer system 1000 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 1000 therefore can embody a general-purpose computer. In another exemplary embodiment, the implementation can be part of a mobile device, such as, for example, a mobile phone, a personal data assistant (PDA), a tablet computer, etc.

As shown in FIG. 10, the computer 1000 includes processor 1001. Computer 1000 also includes memory 1002 communicatively coupled to processor 1001, and one or more input/output adapters 1003 that can be communicatively coupled via system bus 1005. Memory 1002 can be communicatively coupled to one or more internal or external memory devices via a storage interface 1008. Communications adapter 1016 can communicatively connect computer 1000 to one or more networks 1006. System bus 1005 can communicatively connect one or more user interfaces via input/output (I/O) adapter 1003. I/O adapter 1003 can connect a plurality of input devices 1004 to computer 1000. Input devices can include, for example, a keyboard, a mouse, a microphone, a sensor, etc. System bus 1005 can also communicatively connect one or more output devices 1007 via I/O adapter 1003. Output device 1007 can include, for example, a display, a speaker, a touchscreen, etc.

Processor 1001 is a hardware device for executing program instructions (aka software), stored in a computer-readable memory (e.g., memory 1002). Processor 1001 can be any custom made or commercially available processor, a central processing unit (CPU), a plurality of CPUs, an auxiliary processor among several other processors associated with the computer 1000, a semiconductor based microprocessor (in the form of a microchip or chip set), or generally any device for executing instructions. Processor 1001 can include a cache memory 1022, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 1022 can be organized as a hierarchy of more cache levels (L1, L2, etc.).

Processor 1001 can be disposed in communication with one or more memory devices (e.g., RAM 1009, ROM 1010, one or more external databases 1021, etc.) via a storage interface 1008. Storage interface 1008 can also connect to one or more memory devices including, without limitation, one or more databases 1021, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 1002 can include random access memory (RAM) 1009 and read only memory (ROM) 1010. RAM 1009 can be any one or combination of volatile memory elements (e.g., DRAM, SRAM, SDRAM, etc.). ROM 1010 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 1002 can incorporate electronic, magnetic, optical, and/or other types of non-transitory computer-readable storage media. Memory 1002 can also be a distributed architecture, where various components are situated remote from one another, but can be accessed by processor 1001.

The instructions in memory 1002 can include one or more separate programs, each of which can include an ordered listing of computer-executable instructions for implementing logical functions. In the example of FIG. 10, the instructions in memory 1002 can include an operating system 1011. Operating system 1011 can control the execution of other computer programs and provides scheduling, input-output control, file and data management, memory management, and communication control and related services.

The program instructions stored in memory 1002 can further include application data 1012, and for a user interface 1013.

Memory 1002 can also include program instructions for the trace generation engine 270, configured to generate unfiltered digital entry data of successful and unsuccessful (erroneous) transactions within a function call list. Memory 1002 can also include program instructions for the trace analysis engine 310, configured to perform the various steps described herein.

I/O adapter 1003 can be, for example but not limited to, one or more buses or other wired or wireless connections. I/O adapter 1003 can have additional elements (which are omitted for simplicity) such as controllers, microprocessors, buffers (caches), drivers, repeaters, and receivers, which can work in concert to enable communications. Further, I/O adapter 1003 can facilitate address, control, and/or data connections to enable appropriate communications among the aforementioned components.

I/O adapter 1003 can further include a display adapter coupled to one or more displays. I/O adapter 1003 can be configured to operatively connect one or more input/output (I/O) devices 1007 to computer 1000. For example, I/O 1003 can connect a keyboard and mouse, a touchscreen, a speaker, a haptic output device, or other output device. Output devices 1007 can include but are not limited to a printer, a scanner, and/or the like. Other output devices can also be included, although not shown. Finally, the I/O devices connectable to I/O adapter 1003 can further include devices that communicate both inputs and outputs, for instance but not limited to, a network interface card (MC) or modulator/demodulator (for accessing other files, devices, systems, or a network), a radio frequency (RF) or other transceiver, a telephonic interface, a bridge, a router, and the like.

According to some embodiments, computer 1000 can include a mobile communications adapter 1023. Mobile communications adapter 1023 can include GPS, cellular, mobile, and/or other communications protocols for wireless communication.

In some embodiments, computer 1000 can further include communications adapter 1016 for coupling to a network 1006.

Network 1006 can be an IP-based network for communication between computer 1000 and any external device. Network 1006 transmits and receives data between computer 1000 and devices and/or systems external to computer 1000. In an exemplary embodiment, network 1006 can be a managed IP network administered by a service provider. Network 1006 can be a network internal to an aircraft, such as, for example, an avionics network, etc. Network 1006 can be implemented in a wireless fashion, e.g., using wireless protocols and technologies, such as WiFi, WiMax, etc. Network 1006 can also be a wired network, e.g., an Ethernet network, an ARINC 429 network, a controller area network (CAN), etc., having any wired connectivity including, e.g., an RS232 connection, R5422 connection, etc. Network 1006 can also be a packet-switched network such as a local area network, wide area network, metropolitan area network, Internet network, or other similar type of network environment. The network 1006 can be a fixed wireless network, a wireless local area network (LAN), a wireless wide area network (WAN) a personal area network (PAN), a virtual private network (VPN), intranet or other suitable network system.

If computer 1000 is a PC, workstation, laptop, tablet computer and/or the like, the instructions in the memory 1002 can further include a basic input output system (BIOS) (omitted for simplicity). The BIOS is a set of routines that initialize and test hardware at startup, start operating system 1011, and support the transfer of data among the operatively connected hardware devices. The BIOS is typically stored in ROM 1010 so that the BIOS can be executed when computer 1000 is activated. When computer 1000 is in operation, processor 1001 can be configured to execute instructions stored within the memory 1002, to communicate data to and from the memory 1002, and to generally control operations of the computer 1000 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating a filtered digital entry comprising:
    generating, via a processor implementing a trace generation engine, a trace indicative of successful transactions and erroneous transactions;
    instantiating, via the processor, a plurality of buffers in a buffer pool configured to record a trace on a function boundary;
    analyzing each buffer in the buffer pool based on the trace on the function boundary to evaluate whether each function entry in the trace contains an erroneous transaction;
    responsive to determining that a function entry contains an erroneous transaction, setting an output flag in a call stack map associated with that function; and
    generating, via the processor, a filtered digital entry based on the call stack map, wherein the filtered digital entry includes only erroneous transaction data from the trace,
    wherein setting the output flag in the call stack map comprises:
        evaluating an entry in a call stack;
        selecting an available buffer of the plurality of buffers and saving the erroneous function entry to the available buffer;
        evaluating a next function entry based on a determined search width and an affinity score, wherein the affinity score is assigned by a user to one or more function types;
        saving any subsequent functions called by the erroneous function entry to a respective available buffer in the buffer pool; and
        setting an output flag for each erroneous function entry in the call stack map.

2. A system for creating a filtered digital entry comprising:
a processor configured to:
    generate a trace indicative of successful transactions and erroneous transactions;
    instantiate a plurality of buffers in a buffer pool configured to record a trace on a function boundary;
    analyze each buffer in the buffer pool based on the trace on the function boundary to evaluate whether each function entry in the trace contains an erroneous transaction;
    responsive to determining that a function entry contains an erroneous transaction, set an output flag in a call stack map associated with that function; and
    generate a filtered digital entry based on the call stack map, wherein the filtered digital entry includes only erroneous transaction data from the trace;
    wherein the processor setting the output flag in the call stack map comprises the processor:
        evaluating an entry in a call stack;
        selecting an available buffer of the plurality of buffers and saving the erroneous function entry to the available buffer;
        evaluating a next function entry based on a determined search width and an affinity score, wherein the affinity score is assigned by a user to one or more function types;
        saving any subsequent functions called by the erroneous function entry to a respective available buffer in the buffer pool; and
        setting an output flag for each erroneous function entry in the call stack map.

3. A computer program product for generating a filtered digital entry, the computer program product comprising a computer readable storage medium having program instructions embodied therewith, the program instructions executable by a processor to cause the processor to perform a method comprising:
    generating, via the processor implementing a trace generation engine, a trace indicative of successful transactions and erroneous transactions;
    instantiating, via the processor, a plurality of buffers in a buffer pool configured to record a trace on a function boundary;
    analyzing each buffer in the buffer pool based on the trace on the function boundary to evaluate whether each function entry in the trace contains an erroneous transaction;
    responsive to determining that a function entry contains an erroneous transaction, setting an output flag in a call stack map associated with that function; and generating, via the processor, a filtered digital entry based on the call stack map, wherein the filtered digital entry includes only erroneous transaction data from the trace;

wherein setting the output flag in the call stack map comprises:
  evaluating an entry in a call stack;
  selecting an available buffer of the plurality of buffers and saving the erroneous function entry to the available buffer;
  evaluating a next function entry based on a determined search width and an affinity score, wherein the affinity score is assigned by a user to one or more function types;
  saving any subsequent functions called by the erroneous function entry to a respective available buffer in the buffer pool; and
  setting an output flag for each erroneous function entry in the call stack map.

\* \* \* \* \*